United States Patent
McCullough

(10) Patent No.: US 6,407,149 B1
(45) Date of Patent: Jun. 18, 2002

(54) METHOD OF MANUFACTURING AN EVENLY COLORED THERMALLY CONDUCTIVE COMPOSITE

(75) Inventor: Kevin A. McCullough, Warwick, RI (US)

(73) Assignee: Cool Options, Inc., Warwick, RI (US)

( * ) Notice: Subject to any disclaimer, the term of this patent is extended or adjusted under 35 U.S.C. 154(b) by 0 days.

(21) Appl. No.: 09/726,145

(22) Filed: Nov. 29, 2000

Related U.S. Application Data

(60) Provisional application No. 60/169,154, filed on Dec. 6, 1999.

(51) Int. Cl.[7] .............................. C08K 9/00; C08K 3/04; C08K 3/08; C09K 19/54
(52) U.S. Cl. .................. 523/205; 523/215; 523/351; 524/439; 524/441; 524/495; 252/299.01; 264/331.11
(58) Field of Search .................. 523/351, 205, 523/215; 524/439, 441, 495; 252/299.01; 264/331.11

(56) References Cited

U.S. PATENT DOCUMENTS

| | | | |
|---|---|---|---|
| 5,541,240 A | * | 7/1996 | Makhija et al. |
| 5,710,197 A | * | 1/1998 | Fischer et al. |
| 6,197,848 B1 | * | 3/2001 | Whitehouse et al. |
| 6,224,664 B1 | * | 5/2001 | Müller-Rees et al. |

* cited by examiner

*Primary Examiner*—Tae H. Yoon
(74) *Attorney, Agent, or Firm*—Barlow, Josephs & Holmes, Ltd.

(57) ABSTRACT

A method of molding an evenly colored, thermally conductive composition. Thermally conductive filler material is colored and mixed with a base polymer matrix. The mixture is molded into the desired shape. The step of for coloring the filler material is tailored to the type of thermally conductive filler used and could include, as required, anodizing, spraying or dying of the material before mixing with the base polymer matrix and prior to molding.

7 Claims, No Drawings

METHOD OF MANUFACTURING AN EVENLY COLORED THERMALLY CONDUCTIVE COMPOSITE

This application claims benefit of Provisional Application Ser. No. 60/169,154 filed Dec. 6, 1999.

BACKGROUND OF THE INVENTION

The present invention relates generally to an improved method of manufacturing a composite material. More specifically, the present invention relates to a method of manufacturing a molded material, formed from a base matrix loaded with filler material, that results in a completed composition having a uniformly colored appearance.

In the prior art, it is known to load base polymer matrix materials with thermally conductive filler materials to create a composition that, after molding, has thermally conductive properties. In addition, it is also known for the base matrix molding material to take on to a large extent, the color of the filler material that is loaded therein. Since the concentration of the filler material within the composition may approach 60% or more by volume, the color of the filler can have a significant impact on the color of the final composition. An example of such a composition is a polymer base matrix with carbon fiber filler loaded therein. The polymer base matrix allows the material to be easily injection molded, while the carbon fiber improves the overall thermal conductivity of the molded part. As a result, the molded part has high thermally conductive properties and is also net shape molded, meaning that the part is in its final configuration obviating the need for further machining.

The drawback in the present technology however, is that while the finished product's resultant color is influenced by the color of the filler material loaded therein, the overall color is not uniform throughout the part. This uneven coloring results from the fact that the base and filler components used in the process respectively have two different colors. When mixed, as is well known in the art, the two components each contribute to the final appearance of the molded part and often cause a marbled, uneven or erratic appearance that results in an unattractive part. In addition, typically the final color is simply not the correct or desired color for the intended use of the molded part. Using the example above, the resulting color of a molded part, formed from a base matrix polymer with a light color and carbon fiber filler with a dark gray color, would be mottled and streaky with veins of dark gray randomly distributed throughout the part. Further, even coloration may also be functionally critical. For example, an even black color may be required for a satellite dish to ensure absorption of a certain wavelength of radiation.

Since these molded composite materials are often used to form parts that are employed in the construction of an article that can be seen, it is important to have a method by which these parts can be fabricated that results in an aesthetically attractive appearance. For example, a thermally conductive composite material may be employed to construct the outer case of a laptop computer. The material would impart a highly desirable characteristic to the computer case by allowing it to efficiently conduct and dissipate heat that is generated within the computer, however, if fabricated using the current technology, the computer would have an undesirable, uneven and streaky appearance.

In view of the foregoing, there is a demand for a moldable composite material that has a uniformly colored appearance and is highly thermally conductive. In addition, there is a demand for a thermally conductive composite material that can be molded or cast into complex product geometries with a resulting uniformly colored appearance.

SUMMARY OF THE INVENTION

The present invention preserves the advantages of prior art thermally conductive plastic compositions, namely net shape moldablity and thermal conductivity. In addition, it provides new advantages of uniform coloration not found in currently available compositions.

The present invention is generally directed to a novel and unique process for molding a thermally conductive plastic composite material with a uniform and even color. The present invention provides a process that has application in producing products where the use of a thermally conductive polymer is indicated and the aesthetic appearance of the final part is important. This process provides for net shape moldable, thermally conductive parts that can be fabricated in the color desired by the end user and can be produced with a uniform appearance.

The process of the present invention provides for the filler material to be colored to match as closely as possible the desired color of the end product before mixing it into a base polymer matrix. The mixture is then molded into the desired final shape. The resulting composition has an even uniform color that is suitable for use in highly visible applications for example, computer and cell phone cases or satellite dish receivers. In these applications there is a need to quickly dissipate heat to the exterior of the device. The polymer case of these devices would be the ideal surface through which to accomplish this heat dissipation function, but prior to the present invention this was infeasible. Although the technology existed to mold thermally conductive polymers, the end product did not have a sufficiently uniform appearance to be used in the fabrication of external component parts.

The present invention requires that, prior to the mixing and molding steps, the filler material be colored with a coating material that is the desired color of the finished product. The particular coloring process in accordance with the present invention depends on the filler to be employed. In products where the thermally conductive filler is a metallic flake material, the coloring process would be either spraying or anodizing. For example, if aluminum flakes are used as filler, the flakes are first anodized in a color that closely matches the desired end color of the product and then mixed into the base polymer matrix and finally subjected to a conventional molding process. If the thermally conductive filler used is of a non-metallic type, like carbon fiber, the fibers would be dyed to match the desired resulting color and then mixed into the base polymer and molded into the desired shape.

The present invention has potential impact not only in the production of composite components that have a color that is suitable for aesthetic appearances, but will also allow the components to be colored in a manner that will best stabilize them against the elements to which the part may be subjected. For example, a thermally conductive composite could be employed to fabricate the casing and dish for a satellite receiver. A device of this type, by its nature must be installed in an environment where it is constantly subjected to damaging sunlight that will potentially breakdown the composite material. For example, the color black may be preferred, a coloration that could not be achieved in a prior art thermally conductive composition. Prior to the present invention the color of the composite was limited to a color that was consistent with the color of the filler material and base polymer matrix. Using the present invention, a composite can be fabricated in a color that is best suited to reflect and withstand the exposure to sunlight.

It is therefore an object of the present invention to provide a process by which a thermally conductive composite material can be colored uniformly.

It is an object of the present invention to provide a process where a conductive composite material has a uniform appearance after molding.

Another object of the present invention is to provide a conductive composite material that enables the molding of complex part geometries with a uniform color throughout the part.

It is yet a further object of the present invention to provide a conductive composite material that can be fabricated in a color desired by the end user of the component.

It is another object of the present invention to provide a thermally conductive composite that can be fabricated of a uniform color so as to withstand prolonged exposure to sunlight.

DETAILED DESCRIPTION OF THE PREFERRED EMBODIMENT

The present invention is a method by which a composition, formed by combining a polymer base matrix and thermally conductive filler, is molded into a finished component that has a uniform appearance. The process is carried out is the same regardless of the type of filler material used, however, the step of coloring the filler material must be varied as it is dependant on the type of filler material used. Therefore, this description will first disclose the general process and then cover the specifics required when using various filler materials.

The process of the present invention employs a base matrix of polymer, for example, with different types of filler material loaded therein. The base matrix is, preferably, liquid crystal polymer; however, it may be other materials. This process is achieved through the steps of combining the base matrix material with a thermally conductive filler material and molding the composition. This process is known to result in producing polymer compositions with high thermal conductivities as compared to the base matrix alone.

The base matrix is loaded with thermally conductive filler. The mixture may include, as an example, by volume, 40 percent base matrix and 60 percent filler material. Depending on the base matrix and filler, loading can be even higher.

One of the primary reasons for employing a thermally conductive plastic composition is that it is moldable into more complex geometries to achieve better heat dissipation. Therefore, intricate part geometries are typically encountered when molding thermally conductive polymer materials. With these intricate geometries, turbulence of the flow of the filler loaded matrix is common resulting in collisions of the filler material and non-uniform alignment and distribution. As a result, as the mixture flows through the mold, small areas of filler may accumulate at points where the mold geometry changes. This effect is further intensified when molding parts that have intricate geometries as a result of the increased turbulent flow experienced by the mixture as it is injected into the mold. This localized accumulation of filler further results in increasing the uneven coloration of the final composition, leaving materials created in this manner suited only for applications where they will not be visible.

The present invention provides a method of forming a thermally conductive composite material by first coloring the thermally conductive filler material that is to be employed. The coloring process must be varied and the anticipated variations will be discussed below. The preferred embodiment of the present invention employs aluminum flakes as a thermally conductive filler material. The method would require that the aluminum flakes be anodized through a conventional anodization process prior to mixing the flakes into the polymer base. The color of the anodization used on the aluminum filler flakes would be determined both by the color of the base polymer and the desired color of the final composition. Once the desired color is determined, the colors of both the base matrix and the anodizing are selected so as to closely match one another.

Once anodized, the filler material is introduced to the base polymer matrix. The two components are mixed and loaded into the desired molding machine and associated mold. Once removed from the mold, the final composition has a uniform appearance with smooth integral color.

As can be understood, the process does not eliminate the localized, random concentrations of filler materials or aggregation of filler at certain points within the mold. The process of the present invention closely matches the color of the filler material to the color of the base polymer so as to make the localized concentrations of filler or base matrix imperceptible as they appear as a similar color within the mixture.

The process of the present invention can be employed for many of the various configurations used in fabricating a thermally conductive composite. Although the preferred embodiment indicates the use of aluminum flake filler in a polymer base matrix, many other fillers can be employed to achieve the desired thermally conductive composition. As the type of filler varies, the method of coloring the particular material must be varied however the overall process of the present invention need not change.

In the case where metallic flake filler other than aluminum is used, or the anodizing of aluminum is not compatible with the requirements of the finished composite, the coloring process may be varied to suit the materials at hand. The filler material can be sprayed with a colored coating material that is compatible both with the filler material and the base matrix material thereby coloring the filler material prior to incorporating it into the molding mixture. In the case of copper, this color coating, byway of example, might be lacquer paint.

In the case where the filler material is of a non-metallic and generally porous material, like carbon fiber, the coloring process may include either dying of the material or spraying a colored coating onto the material. Using these coloring methods also produce the desired result of coloring the filler material before incorporating it into the polymer base matrix.

In view of the foregoing, a superior moldable thermally conductive composite material with a uniformly colored appearance can be realized. The composition of the present invention, greatly improves over prior art attempts to provide such uniformly colored, moldable, thermally conductive material. In particular, the present invention provides uniformity of color that is vastly improved over known compositions. In addition, the present invention permits complex part geometries with a uniformly colored appearance for use in high visibility components.

It would be appreciated by those skilled in the art that various changes and modifications can be made to the illustrated embodiments without departing from the spirit of the present invention. All such modifications and changes are intended to be covered by the appended claims.

What is claimed is:

1. A method of coloring a thermally conductive composition, comprising the steps of:

selecting a desired end color;

providing a base polymer matrix material having a base matrix color;

providing a thermally conductive filler material having a filler color;

coloring said filler material with a color, when combined with the base matrix color, is substantially equal to the desired end color;

mixing said filler material with said base matrix into a mixture; and providing a mixture having a color substantially identical to the desired end color.

2. The method of claim 1, wherein said base matrix is a liquid crystal polymer.

3. The method of claim 1, wherein said thermally conductive filler is a metallic material selected from the group consisting of aluminum, alumina, copper, magnesium and brass.

4. The method of claim 1, wherein said thermally conductive filler is carbon material.

5. The method of claim 1, where the step of coloring said filler material is anodizing.

6. The method of claim 1, where the step of coloring said filler material is spraying with a colored material.

7. The method of claim 1, where the step of coloring said filler material is dying.

* * * * *